United States Patent
Nanavati (10) Patent No.: US 6,181,322 B1
(45) Date of Patent: *Jan. 30, 2001

(54) POINTING DEVICE HAVING SELECTION BUTTONS OPERABLE FROM MOVEMENT OF A PALM PORTION OF A PERSON'S HANDS

(75) Inventor: Amit Nanavati, Milpitas, CA (US)

(73) Assignee: Netscape Communications Corp., Mountain View, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/966,373

(22) Filed: Nov. 7, 1997

(51) Int. Cl.$^7$ ..................................................... G09G 5/00
(52) U.S. Cl. ........................... 345/156; 345/163; 345/167
(58) Field of Search .................................... 345/156–158, 345/163, 167, 184

(56) References Cited

U.S. PATENT DOCUMENTS

| | | | |
|---|---|---|---|
| 4,769,517 | 9/1988 | Swinney | 340/709 |
| 4,816,810 | 3/1989 | Moore | 340/710 |
| 4,917,516 * | 4/1990 | Retter | 400/489 |
| 4,927,987 | 5/1990 | Kirchgessner | 200/5 R |
| 5,006,836 | 4/1991 | Cooper | 340/710 |
| 5,016,213 | 5/1991 | Dilts et al. | 364/900 |
| 5,045,832 * | 9/1991 | Galvin | 340/709 |
| 5,059,958 | 10/1991 | Jacobs et al. | 340/709 |
| 5,175,534 | 12/1992 | Thatcher | 340/706 |
| 5,184,319 | 2/1993 | Kramer | 364/806 |
| 5,231,380 | 7/1993 | Logan | 340/706 |
| 5,260,696 | 11/1993 | Maynard, Jr. | 345/163 |
| 5,287,089 | 2/1994 | Parsons | 345/156 |
| 5,296,871 | 3/1994 | Paley | 345/163 |
| 5,355,147 | 10/1994 | Lear | 345/156 |

(List continued on next page.)

OTHER PUBLICATIONS

"No Hands Mouse" retrieved via the Internet and World–Wide Web at http://www.footmouse.com/tunl$_{13}$ 1.htm, Sep. 27, 1997, 12:07 a.m.

"Is Your Mouse A Trap?" U.S. News, retrieved via the Internet and World–Wide Web at http://www.contour-des.com/usnews.htm, Sep. 27, 1997, 12:04 a.m.

"Mice" retrieved via the internet and World–Wide Web at http:\/www.logitech.com/products/mice/index.htm, Sep. 26, 1997, 11:38 p.m.

"Trackballs", retrieved via the Internet and World–Wide Web at http:\\www.logitech.com\products\trackballs\index.htm, Sep. 26, 1997/11:38 p.m.

(List continued on next page.)

*Primary Examiner*—Richard A. Hjerpe
*Assistant Examiner*—Henry N. Tran
(74) *Attorney, Agent, or Firm*—Erik B. Cherdak & Associates, LLC (57) ABSTRACT

A mouse for use with an automatic data processing system having a display device for displaying objects. The mouse is configured to be operated by movement of an operator's hand and includes a positioning system for controlling a position of a pointer within the display device of the automatic data processing system. The mouse also includes a selection button for selecting an object displayed within the display device and which is pointed to by the pointer. The selection button is configured to generate a signal to be processed by the automatic data processing system. The selection button is operable in accordance with movement of a palm section of the operator's hand.

13 Claims, 12 Drawing Sheets

U.S. PATENT DOCUMENTS

| | | | | |
|---|---|---|---|---|
| 5,396,265 | | 3/1995 | Ulrich et al. | 345/158 |
| 5,583,541 | * | 12/1996 | Solhjell | 345/163 |
| 5,619,231 | | 4/1997 | Shouen | 345/163 |
| 5,726,684 | * | 3/1998 | Blankenship et al. | 345/167 |
| 5,754,126 | * | 5/1998 | Hilbrink et al. | 341/20 |
| 5,812,114 | * | 9/1998 | Loop | 345/157 |

OTHER PUBLICATIONS

"Trackman Voyager—Detail" retrrieved via the Internet and World–Wide Web at http\\www.logitech. com\products/trackballs\tmvoyager\detail.htm, Sep. 26, 1997,11:40 p.m.

"NoHands Mouse" retrieved via the Internet and World–Wide Web at http;://www.footmouse.com, Sep. 27, 1997, 12:06 a.m.

"Contour Mouse" retrieved via the Internet and World–Wide Web at http://www.contourrdes.com, Sep. 27 1997, 12:06 a.m.

"Altra MicroPoint" retrieved via the Internet and World–Wide Webb at http://www.altra.com/cgi–bin/WebObjects/Altra?welcome[32] visito, Sep. 26, 1997, 11:55 p.m.

* cited by examiner

POINTING DEVICE HAVING SELECTION BUTTONS OPERABLE FROM MOVEMENT OF A PALM PORTION OF A PERSON'S HANDS

BACKGROUND OF THE INVENTION

1. Field of the Invention

The present invention relates to pointing devices that are used to control automatic data processing systems such as personal computers.

2. Description of the Related Art

Pointing devices such as mice and trackball units are well known. In fact, sold with many new personal computing devices is a mouse that may be used to control operating system and application program functions and, in particular, the operations of a graphical user interface. Moreover, many operating systems and application programs cannot be effectively operated without the use of a mouse or other pointing device to control and select screen objects that may be displayed within a graphical user interface. For example, navigating through hyper-text documents via the Internet and the world wide web would be difficult and less effective if one were not able to select screen objects and control system operations through use of a pointing device such as a mouse.

Despite their wide spread use and acceptance, use of pointing devices such as mice are not without their problems. Generally, it has long been recognized that any type of repetitive physical activity may lead to stress related injuries which, in turn, can lead to chronic pain, fatigue, and even disability. In particular, it is well known that constant and prolonged use of a pointing device such as a mouse may lead to physical problems of the hand and wrist known as carpal tunnel syndrome.

To attempt to solve certain problems associated with repetitive motion realized in connection with pointing device use, various devices have been proposed. Such devices generally can be classified into two distinct groups. A first group consists of improved pointing devices. A second group consists of alternative pointing devices.

The group of improved pointing devices is exemplified by the CONTOUR MOUSE™ which is manufactured and marketed by CONTOUR DESIGNS, INC. The CONTOUR MOUSE™ is available in multiple sizes for both right-handed and left-handed individuals. The principle features of the CONTOUR MOUSE™ that are used to combat the effects of repetitive motion injuries include a contoured casing and contoured mouse selection buttons which may be operated by the fingers of an operator in a conventional way. Unfortunately, however, although more "ergonomic" in terms of its structure than conventional mouse pointing devices, the CONTOUR MOUSE™ and other similar devices still require constant and repetitive finger motion to control computer program execution and the like. As such, devices like the CONTOUR MOUSE™ do not prevent injury to the delicate structures of an operator's hand that can result from repetitive motions or operations.

The group of alternative pointing devices is exemplified by the NO HANDS MOUSE™ manufactured and marketed by Hunter Digital Corporation. The NO HANDS MOUSE™ attempts to prevent the effects of repetitive mouse-related operations such as carpal tunnel syndrome by completely removing the mouse from an operator's hand and placing cursor control and object selection structures within a foot-operated device. Unfortunately, foot-operated cursor control devices like the NO HANDS MOUSE™ have not realized the popularity that hand-operated devices have in recent years. Such a lack of popularity may be the result of the fact that people tend to have less dexterity in their feet than in their hands. As such, foot-operated pointing devices do not provide the accuracy that hand-operated cursor control devices have realized.

Thus, there exists a need to provide an improved pointing device which will allow cursor control via hand-based operation and which will alleviate the risks of injury associated with repetitive physical movement. Such a device will need to alleviate the stress and strain on the delicate structures of a person's hand while still allowing effective and accurate cursor control and screen object selection.

SUMMARY OF THE INVENTION

In view of the foregoing comments regarding the related art, the principal object of the present invention is to solve the aforementioned problems.

It is another object of the present invention to provide a pointing device that alleviates problems associated with repetitive hand movement and that allows effective and accurate cursor control.

It is still another object of the present invention to provide a hand-operated pointing device that has screen object selection buttons that are arranged at the base of the hand-operated pointing device and which may cause "mouse click" signals to be generated as a result of movement of a person's palm.

It is yet a further object of the present invention to provide a hand-operated pointing device that has screen object selection buttons that are operable from a bottom surface of the hand-operated pointing device.

By achieving such objects, the present invention provides certain benefits including the alleviation of risks of injury as a result of repetitive hand movement often realized from pointing device operation. And, at the same time, the present invention will allow effective and accurate cursor control. Accordingly, the present invention will enrich the computing experience and promote healthier living without pain that has heretofore often been realized from repetitive hand movement associated with computer and pointing device operation.

The present invention achieves its objects to realize the aforementioned benefits by providing a mouse for use with an automatic data processing system having a display device for displaying objects. The mouse is configured to be operated by movement of an operator's hand and includes a positioning system for controlling a position of a pointer within the display device of the automatic data processing system. The mouse also includes one or more selection buttons which can be used to select an object displayed within the display device and which is pointed to by the pointer. The selection buttons are configured to generate signals to be processed by the automatic data processing system. The buttons are operable in accordance with movement of a palm section of the operator's hand.

According to another aspect of the present invention, a mouse is provided that includes a case having bottom side, a positioning system for controlling a position of a pointer within the display device of the automatic data processing system. The positioning system is operable from the bottom side of said case. Additionally, the mouse includes a selection button for selecting an object displayed within the display device and which is pointed to by the pointer. The selection button is configured to cause a signal to be produced which may be communicated to and processed by the automatic data processing system. The selection button is operable from the bottom side of the case.

Finally, according to another aspect of the present invention, a pointing device is provided that may be used to control an automatic data processing system. The pointing device is configured to be operated by the movement of a palm portion of an operator's hand and includes one or more buttons for controlling the operation of the automatic data processing system. The button(s) will cause corresponding signal(s) to be produced within the pointing device and communicated to and processed by the automatic data processing system after the palm section of said operator's hand operates the button(s).

BRIEF DESCRIPTION OF THE DRAWING FIGURES

The present invention is described below with reference to the following drawing figures, of which.

DETAILED DESCRIPTION OF THE PREFERRED EMBODIMENTS

The present invention is now described with reference to the drawing figures that were briefly described above. Unless otherwise specified, like parts are referred to with like reference numerals.

Figure 1:
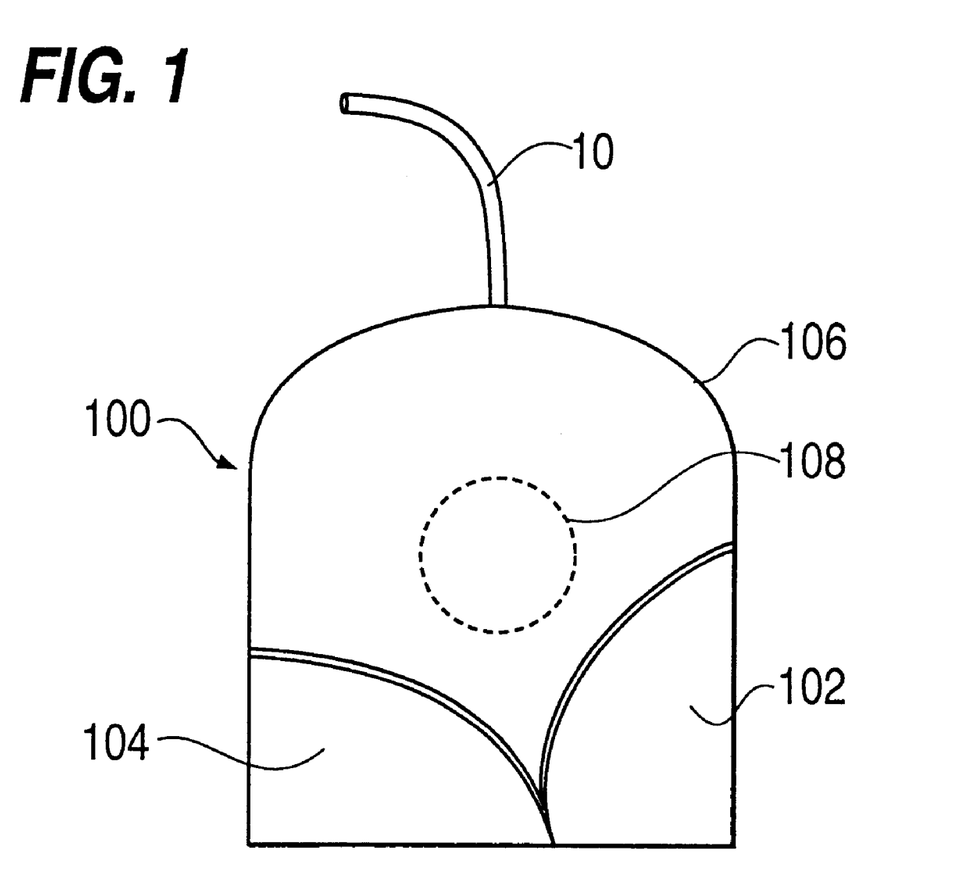
FIG. 1 is a top view of a right-handed pointing device according to a preferred embodiment of the present invention.

Referring now to FIG. 1, depicted therein is a top view of a right-handed pointing device according to a preferred embodiment of the present invention. Pointing device 100 is a computer mouse device that may be used to operate an automatic data processing system, such as a personal computer or a computer workstation and, in particular, may be used to position a cursor within a display device and select screen objects through mouse button selection operation in the context of a computer program (e.g., an application program such as the NETSCAPE COMMUNICATOR V.4.0 application program—NETSCAPE is a registered trademark of Netscape Communications Corp., COMMUNICATOR is a trademark of Netscape Communications Corp.). Pointing device 100 includes a case 106 formed from plastic (e.g., a single-part or multiple-part case formed via plastic injection molding techniques), two selection buttons 102 and 104, a cursor tracking system including a tracking sphere 108 (shown in phantom lines), and an electrical cord 110.

It should be understood that there is no requirement that two selection buttons be incorporated. To the contrary, the present invention can accommodate any number of selection buttons (e.g., one or more) and corresponding switches, so long as they are ergonomically configured and arranged at a rear section of pointing device 100 to allow corresponding operation (e.g., "mouse click" type operation) as a result of movement of the base or palm portion or section of a person's hand. Additionally, it should be understood that selection buttons 102 and 104 are, in fact, top members of corresponding switch assemblies that are incorporated within pointing device 100 to produce corresponding "mouse-click" signals which may be received and processed by an automatic data processing system. Such switch assemblies and their corresponding electronics will be readily understood by those skilled in the art. For example, the switch assemblies and corresponding electronics found in the First Mouse™ computer mouse manufactured and marketed by LOGITECH CORPORATION may be used within the present invention.

Additionally, although pointing device 100 includes cord 110 that couples pointing device 100 to an automatic data processing system, it should be understood that other electrical connection systems may be used. For example, pointing device 100 could be configured with wireless technology, such as infrared, ultrasonic, or radio-frequency technology. Such other electrical connection technology will be readily understood by those skilled in the art. In particular, the wireless technology incorporated into the Cordless MouseMan Pro™ manufactured and marketed by LOGITECH CORPORATION would be suitable to include within pointing device 100 to provide wireless communications of cursor movement and screen object selection signals.

Moreover, although pointing device 100 and the other pointing devices illustrated in other drawing figures which are described below include a cursor positioning system that incorporates an electromechanical system such as one that maintains a tracking sphere like tracking sphere 108 and an associated switch assembly/movement detection system (e.g., movement rollers, etc.), the present invention is not so limited. Other cursor positioning systems may be incorporated such as optical systems that utilize light emitting and/or photo-sensitive diodes or other structures of similar functionality to detect movement across a hatched or patterned surface (e.g., a printed surface on a mouse pad) may be substituted. Preferably, however, a standard electromechanical system that incorporates a tracking sphere like tracking sphere 108 will be used. Such electromechanical cursor positioning systems will be readily understood by those skilled in the art. For example, the electromechanical cursor positioning system found in the MouseMan™ computer mouse manufactured and marketed by LOGITECH CORPORATION may be used.

Figure 2:
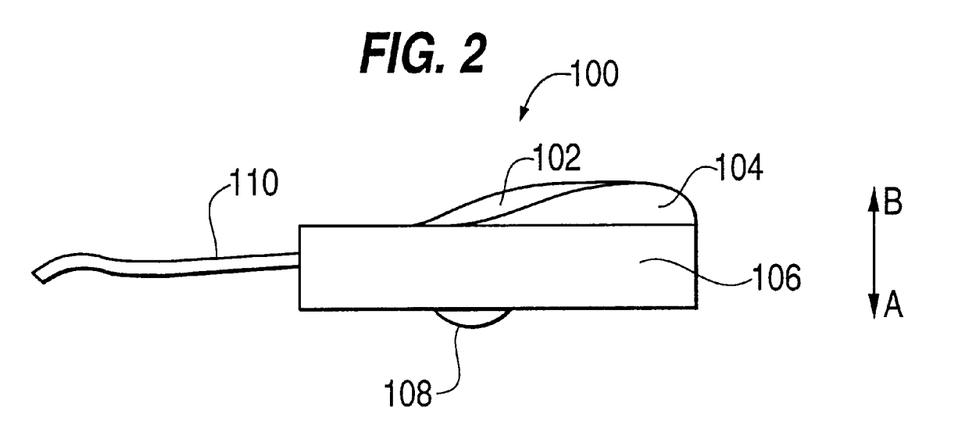
FIG. 2 is a side view of the pointing device depicted in FIG. 1.

Referring now to FIG. 2, depicted therein is a side view of the pointing device depicted in FIG. 1. Here, pointing device 100 is configured to be moved upon a flat surface so that tracking sphere 108 will correspondingly move to cause a positioning system within pointing device 100 to produce cursor positioning signals and, further, which may be used by an automatic data processing system to position a cursor within a screen display environment. Moreover, selection buttons 102 and 104 are shown as being ergonomically designed at the rear of pointing device 100. In particular, selection button 102 has been formed (e.g., during a plastic molding process) to be higher and elongated to allow the right side of the person's palm to very easily cause a switch to contact or close to produce a corresponding signal (e.g., as a result of palm tapping movement that can be said to correspond to a "mouse click").

In FIG. 2, the double-headed arrow having arrow heads identified as A and B, respectively identifies the downward and upward directions of travel which selection buttons 102 and 104 will undergo when operated to cause corresponding selection signals (e.g., "mouse-click" signals) to be generated.

Figure 3:
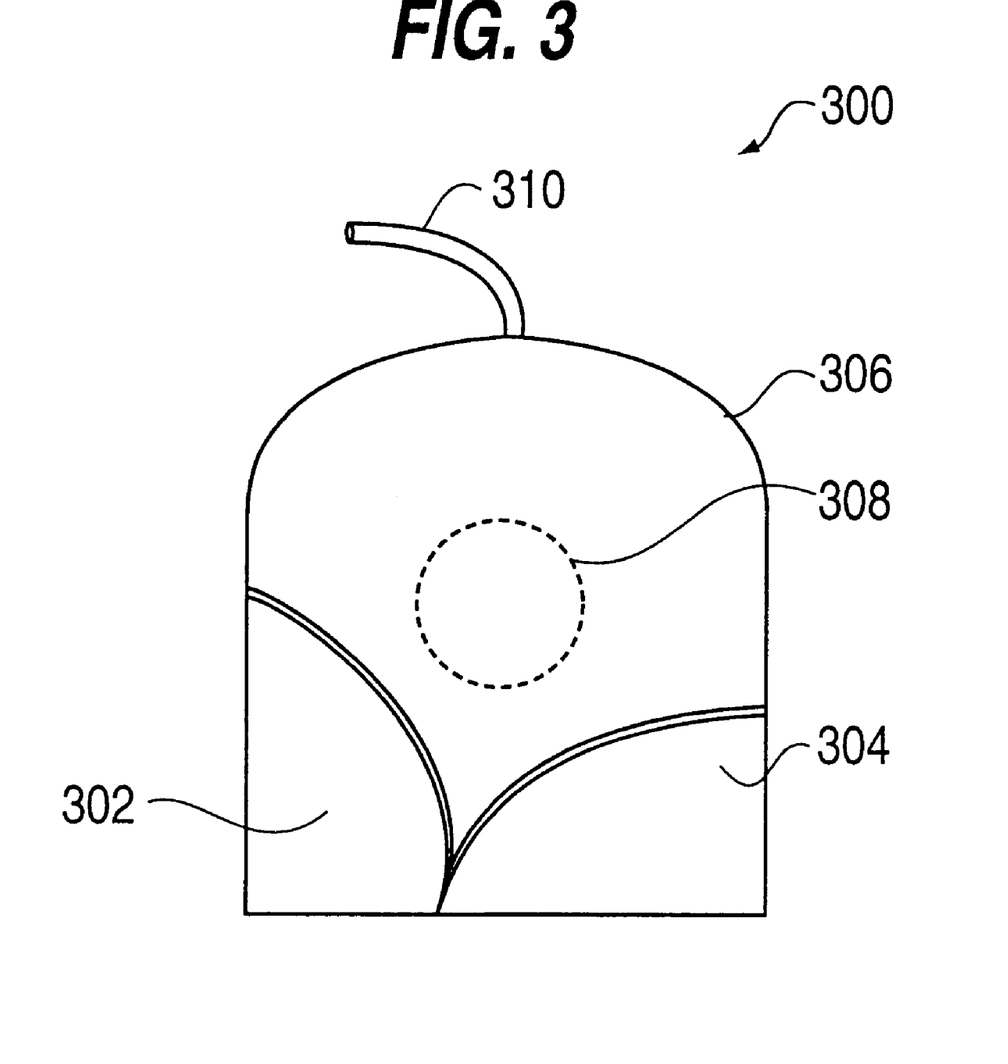
FIG. 3 is a top view of a left-handed pointing device according to a preferred embodiment of the present invention.

Referring now to FIG. 3, depicted therein is a top of view of a left-handed pointing device according to a preferred embodiment of the present invention. The reference numerals shown in FIG. 3 correspond to those shown in FIG. 1. That is, pointing device 300 includes a case 306 formed from plastic (e.g., a single-part or multiple-part case formed via plastic injection molding techniques), two selection buttons 302 and 304, a cursor positioning system including a tracking sphere 308 (shown in phantom lines), and an electrical cord 310. The positions and arrangement of selection buttons 302 and 304 are reversed relative to selection buttons 102 and 104 of pointing device 100 (FIG. 1). Accordingly, pointing device 300, will allow a left-handed user to take advantage of the ergonomic features of pointing device 300 to operate an automatic data processing system. In particular, selection buttons 302 and 304 are ergonomically designed and arranged at the rear of pointing device 300, so as to be operated by movement of a user's left hand (e.g., a palm portion thereof).

Figure 4:
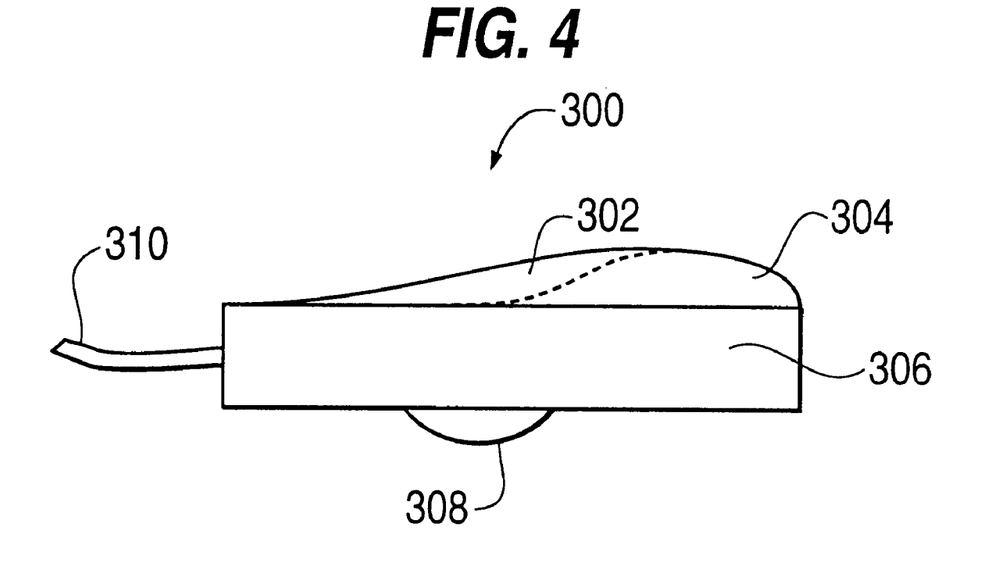
FIG. 4 is a side view of the pointing device depicted in FIG. 3.

Referring now to FIG. 4, depicted therein is a side view of the pointing device depicted in FIG. 3. Here, since selection button 302 of pointing device 300 is on the left side of the pointing device, selection button 304 is shown in phantom lines.

Figure 5:
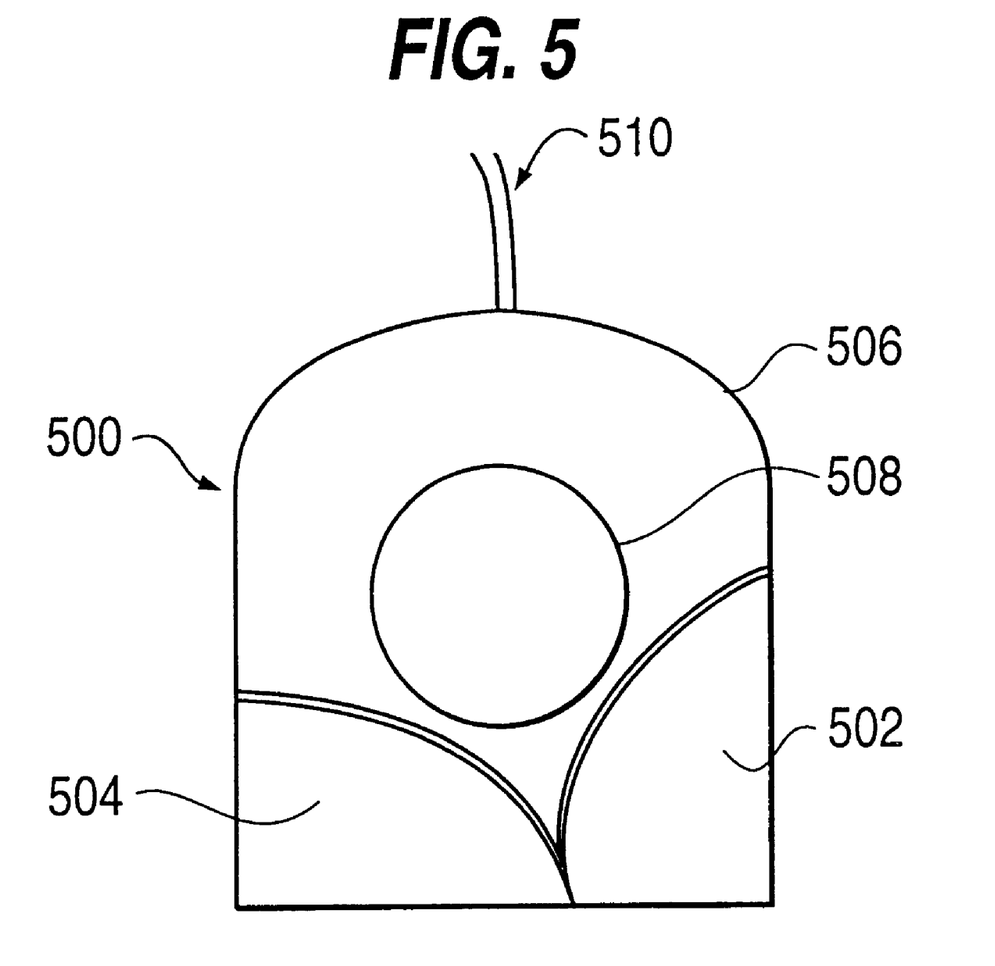
FIG. 5 is a top view of a right-handed trackball pointing device according to a preferred embodiment of the present invention.

Referring now to FIG. 5, depicted therein is a top view of a right-handed pointing device of the track ball variety according to a preferred embodiment of the present invention. In particular, track ball pointing device 500 includes a case 506 formed from plastic (e.g., a single-part or multiple-part case formed via plastic injection molding techniques), selection buttons 502 and 504, a cursor positioning system including a track ball 508, and an electrical cord 510 which is intended to couple track ball pointing device 500 to an automatic data processing system. The arrangement and operation of selection buttons 502 and 504 are the same as selection buttons 102 and 104 as shown in relation to the pointing device depicted in FIG. 1.

The arrangement and operation of a track ball cursor positioning system that includes a track ball like track ball 508 will be readily understood by those skilled in the art. For example, a suitable trackball cursor positioning system that may be incorporated into trackball pointing device 500 is the one that is included within the TrackMan™ trackball cursor positioning product that is manufactured and marketed by LOGITECH CORPORATION. Additionally, the electronics that may be incorporated into trackball pointing device 500 will be readily understood by those skilled in the art. For a discussion of such electronics, reference is made to U.S. Pat. No. 5,122,654 to Koh, et al. which is incorporated herein by reference.

The operation of trackball pointing device 500 will be immediately understood by those skilled in the art. Moreover, the operation of selection buttons 502 and 504 to generate "mouse click" selection type signals will be readily understood by those skilled in the art.

Figure 6:
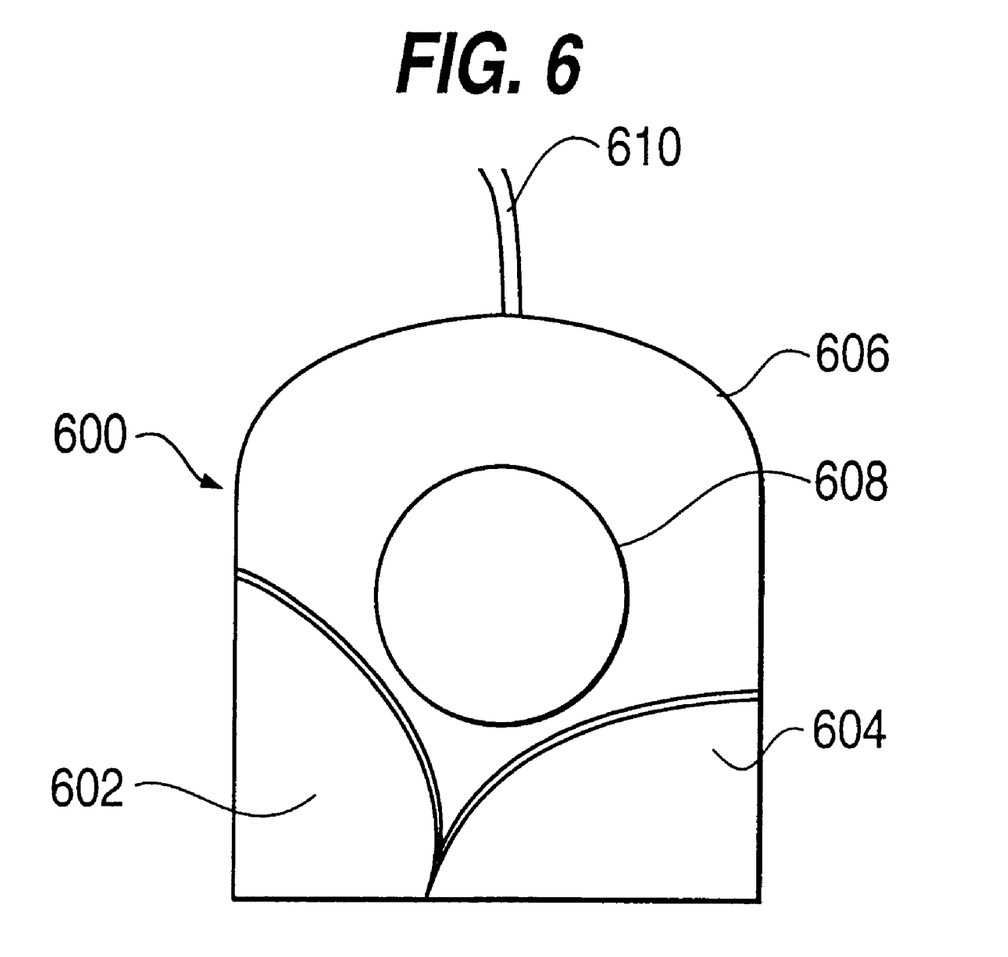
FIG. 6 is a top view of a left-handed trackball pointing device according to a preferred embodiment of the present invention.

Referring now to FIG. 6, depicted therein is a top view of a left-handed track ball pointing device according to a preferred embodiment of the present invention. In particular, track ball pointing device 600 includes a case 606 formed from plastic (e.g., a single-part or multiple-part case formed via plastic injection molding techniques), selection buttons 602 and 604, a cursor positioning system including a track ball 608, and an electrical cord 610 intended to couple track ball pointing device 600 to an automatic data processing system. With the exception of the arrangement of selection buttons 602 and 604, track ball pointing device 600 is like trackball pointing device 500 in terms of structure and operation.

Figure 7:
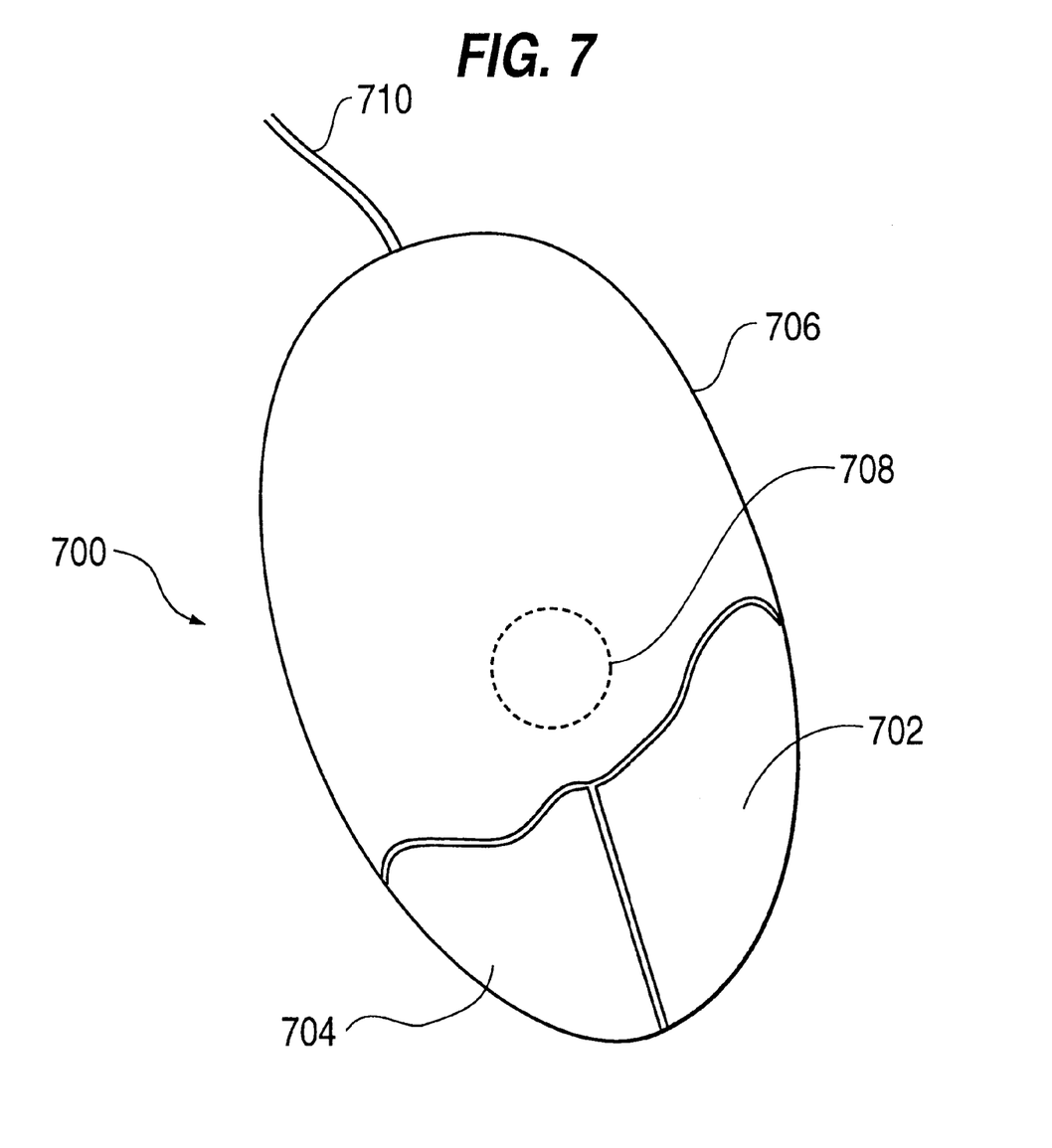
FIG. 7 is a top view of a right-handed pointing device according to a preferred embodiment of the present invention.

Referring now to FIG. 7, depicted therein is a pointing device 700 which is similar to pointing device 100, but which has been constructed to be stylish and more ergonomic. Pointing device 700 includes a case 706 formed from plastic (e.g., a single-part or multiple-part case formed via plastic injection molding techniques), selection buttons 702 and 704, a bottom operable cursor positioning system including a tracking sphere 708, and an electrical cord 710 which is intended to couple pointing device 700 to an automatic data processing system.

Figure 8:
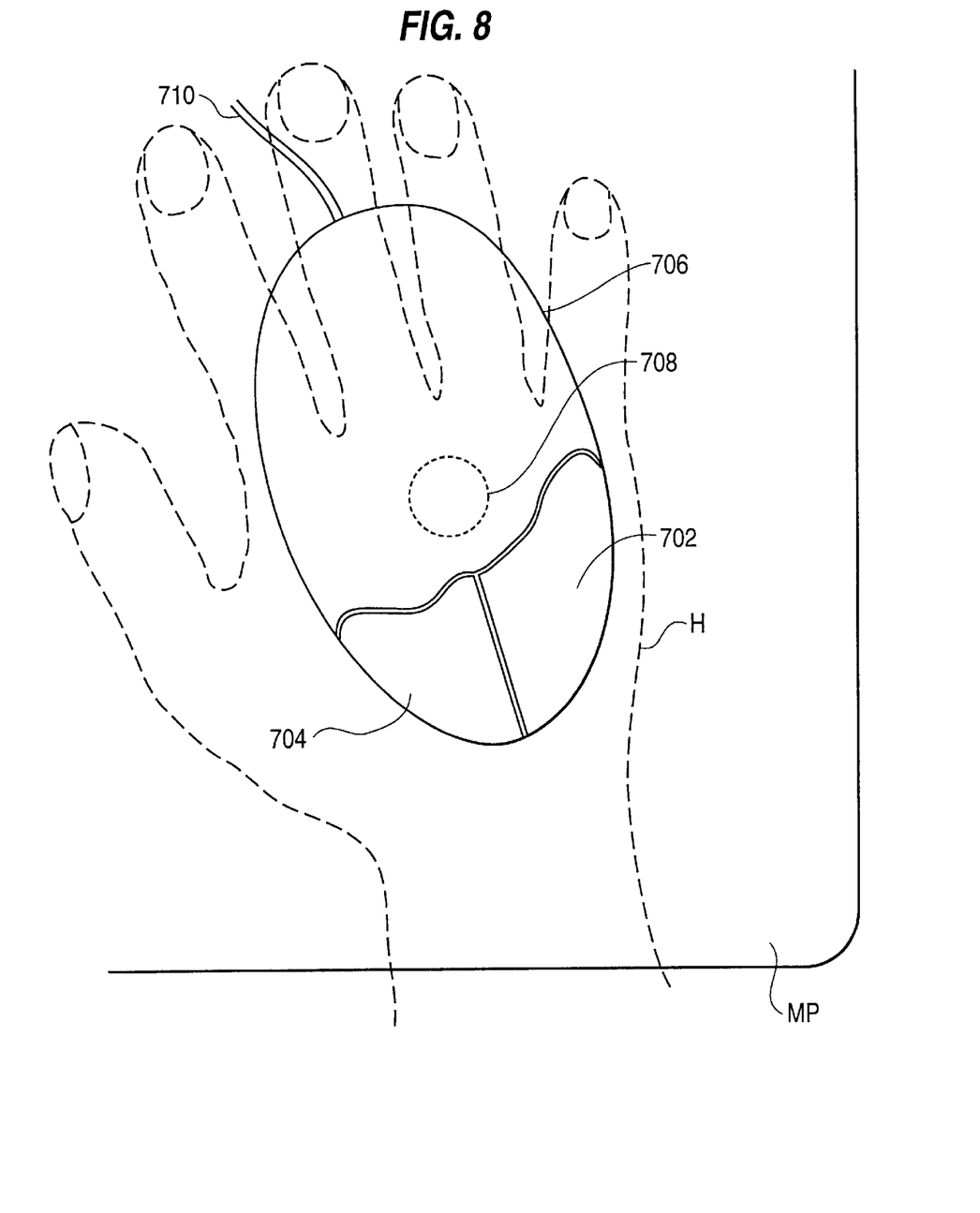
FIG. 8 is a top view of the pointing device depicted in FIG. 7 after it had been placed into operation to control an automatic data processing system.

Referring now to FIG. 8, depicted therein is pointing device 700 after it had been placed into operation to control an automatic data processing system. More particularly, a person's hand H has been placed on top of pointing device 700 which is disposed upon a mouse pad MP on top of a desk or on another flat surface. Movement of hand H will cause pointing device 700 to be correspondingly moved across mouse pad MP to thereby cause tracking sphere 708 to move and to cause the generation of appropriate positioning signals which are then communicated to an automatic data processing system.

Additionally, rocking motions at the base of pointing device 700 by a palm portion of hand H will correspondingly operate selection buttons 702 and 704. By operating selection buttons 702 and 704 in the aforementioned manner, "mouse click" signals will be produced and communicated via cord 710 to an automatic data processing system which will process such signals accordingly (e.g., to change the flow of a computer program via selection of screen objects and the like).

Figure 9:
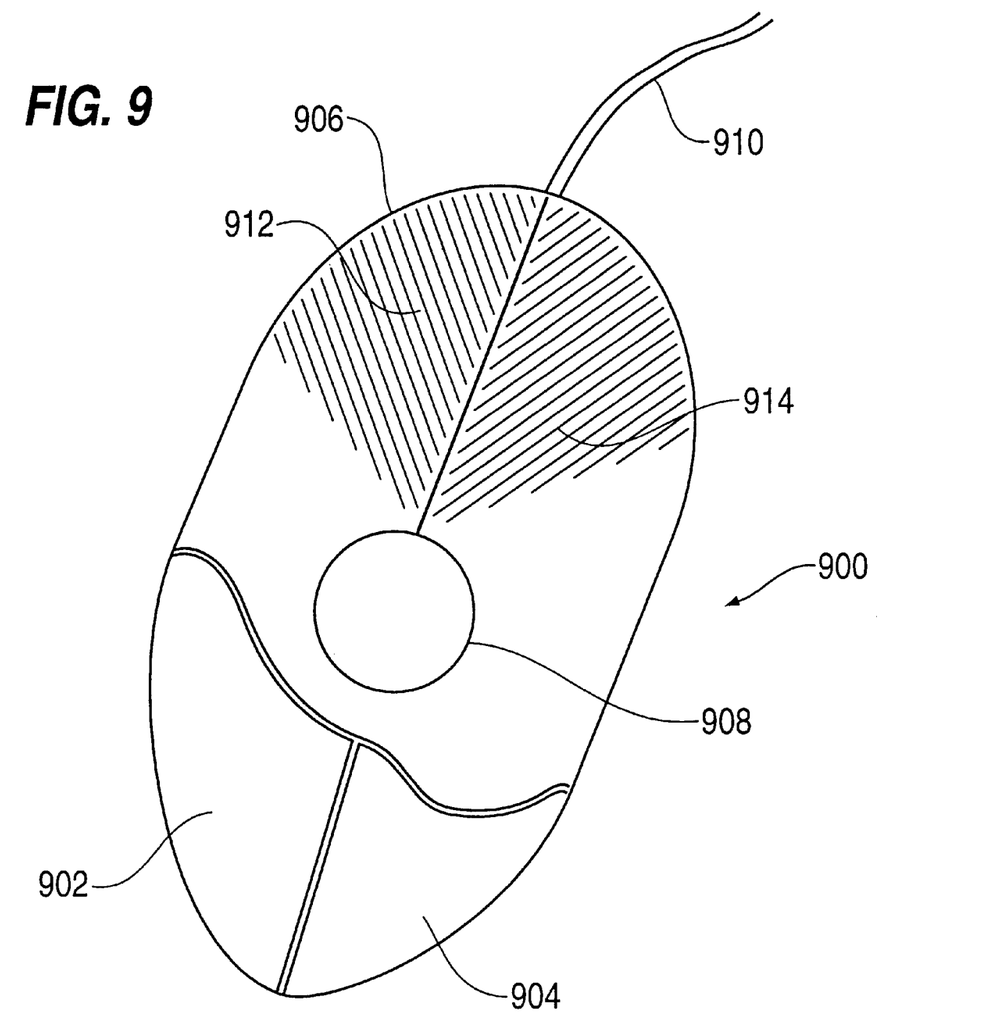
FIG. 9 is a bottom view of a pointing device having bottom-operable selection switches according to a preferred embodiment of the present invention.

Referring now to FIG. 9, depicted therein is a bottom view of a right-handed pointing device having bottom operable selection buttons. In particular, pointing device 900 includes a case formed from plastic (e.g., a single-part or multiple-part case formed via plastic injection molding techniques) having faceted surfaces 912 and 914, bottom operable selection buttons 902 and 904, a bottom operable cursor positioning system including a tracking sphere 908, and an electrical cord 910 which is intended to couple pointing device 900 to an automatic data processing system.

Faceted surfaces 912 and 914 allow pointing device 900 to be rocked from side to side via manual operation when pointing device 900 is turned over and placed into operation. The faceted surfaces formed at the bottom surface of pointing device 900 are similar in design and construction to those illustrated in U.S. Pat. No. 5,260,696 to Maynard, Jr. which is incorporated herein by reference. Moreover, faceted surfaces 912 and 914 and pointing device 900 are configured such that rocking motions will not cause tracking sphere 908 to cause erroneous cursor positioning signals to be generated.

Figure 10:
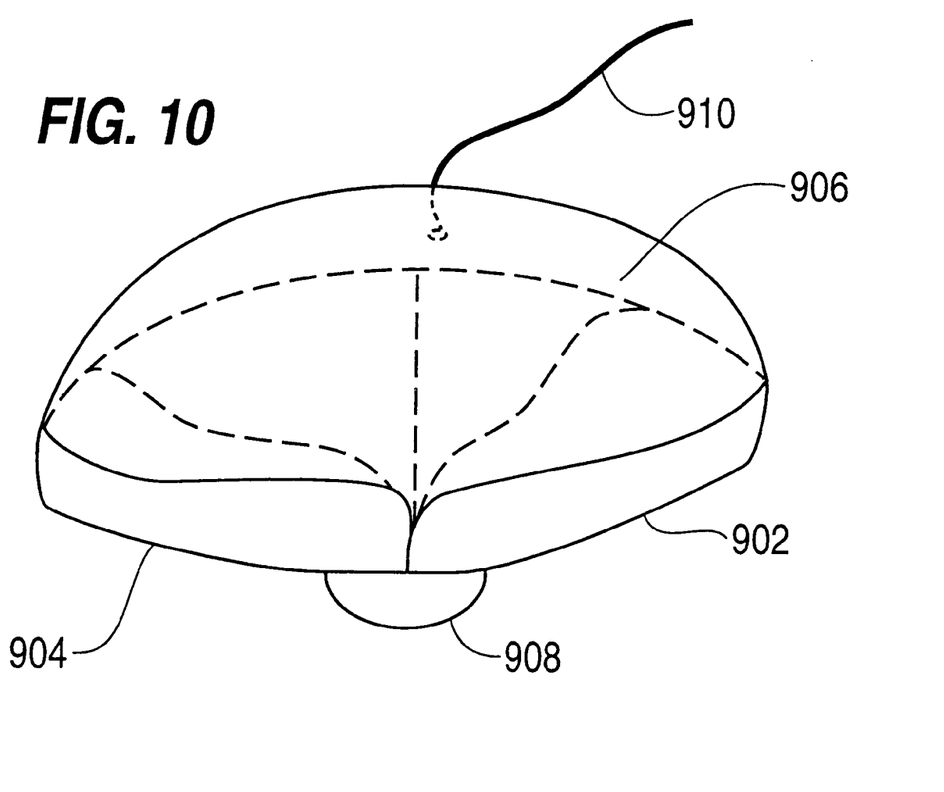
FIG. 10 is a rear view of the pointing device depicted in FIG. 9.

Referring now to FIG. 10, depicted therein is a rear view of pointing device 900. In particular, facet sections 912 and 914 allow pointing device 900 to be rocked from side-to-side to thereby cause, if appropriate pressure is applied, selection buttons 902 and 904 to correspondingly close and generate selection signals which will be communicated to an automatic data processing system via cord 910. Selection buttons 902 and 904, which are partially shown in phantom lines, include button switch covers that are visible from the rear of pointing device 900. That is, selection buttons 902 and 904 form part of the case of pointing device 900. Selection button 902 is slightly elongated (as shown by the phantom lines at the bottom of pointing device 900) to promote right-handed operation of pointing device 900. Of course, such arrangement can be altered and changed (e.g., for left-handed operation) to suit particular design and construction requirements.

Figure 11:
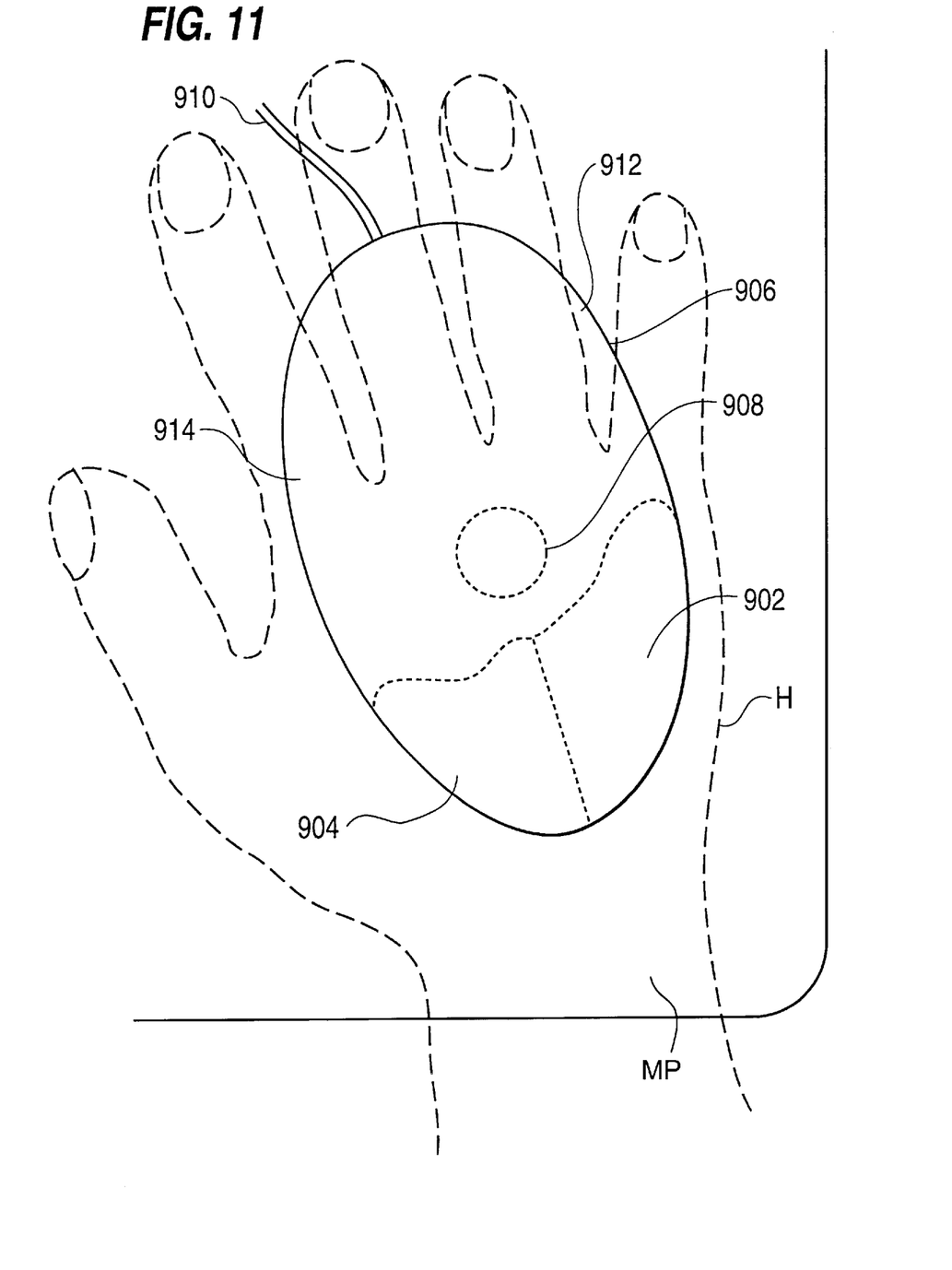
FIG. 11 is a top view of the pointing device depicted in FIG. 9 after it had been placed into operation to control an automatic data processing system.

Referring now to FIG. 11, depicted therein is pointing device 900 after it has been placed into operation to control an automatic data processing system such as a personal computer. In particular, a person's hand H has been placed on top of pointing device 900 which is disposed upon a mouse pad MP which resides on a flat horizontal surface. Movement of hand H will cause pointing device 900 to move thereby causing tracking sphere 908 to move and to cause generation of appropriate cursor positioning signals. Since the bottom of case 906 has facet sections 912 and 914, corresponding rocker motions from side-to-side as a result of movement of hand H and, in particular, a palm portion thereof, will cause, if appropriate pressure is applied, selection buttons 902 and 904 to be activated to cause corresponding switches to close and to generate appropriate selection signals which will be communicated via cord 910 to an automatic data processing system such as a personal computer.

Figure 12:
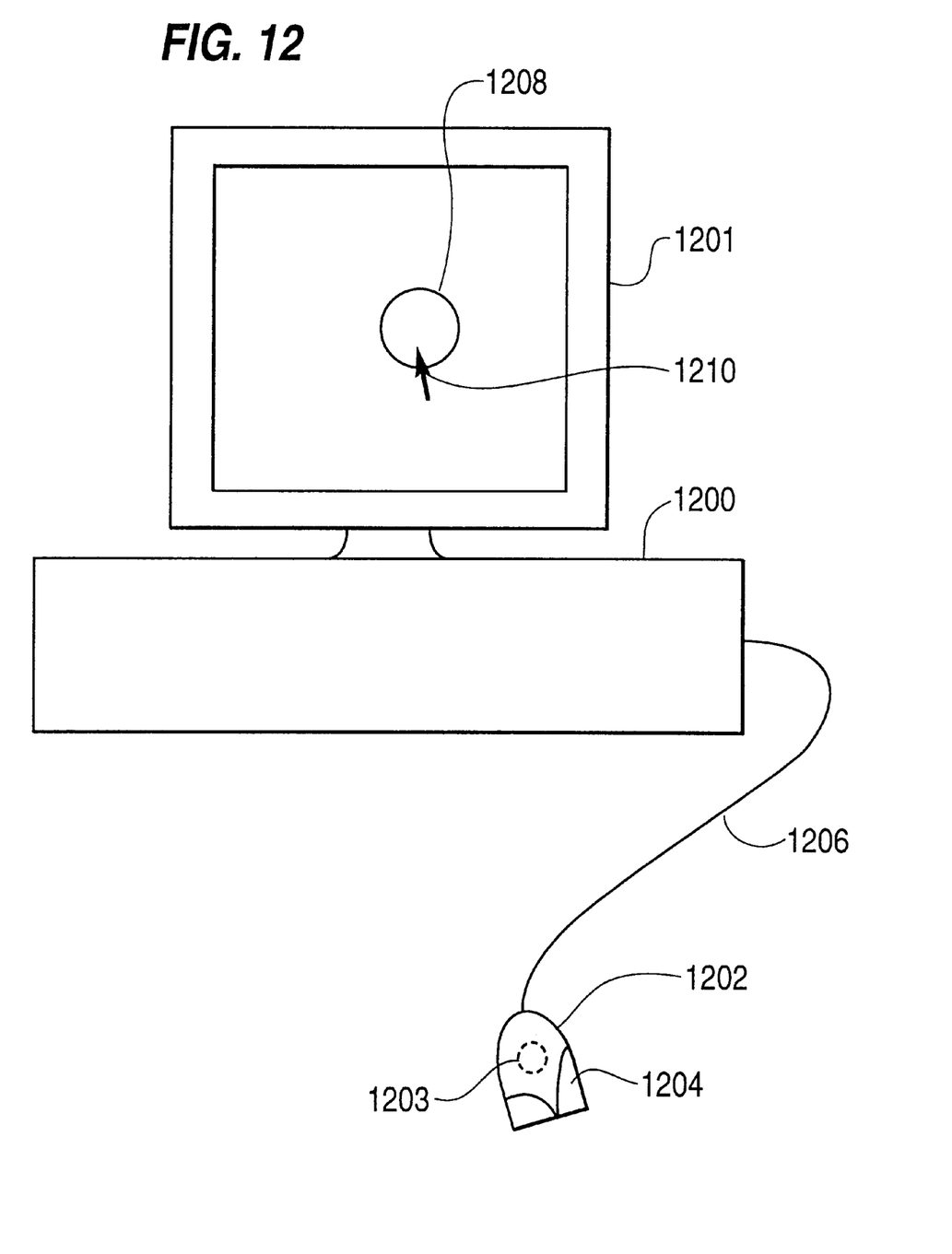
FIG. 12 is a system diagram wherein a pointing device according to the present invention has been placed into operation to control an automatic data processing system.

Referring now to FIG. 12, depicted therein is a system diagram wherein a pointing device according to the present invention has been placed into operation to control an automatic data processing system 1200. In particular, signals generated by pointing device 1202 by either cursor positioning system 1203 (shown in phantom lines) and/or selection button 1204 will be communicated via an electrical cord 1206 to automatic data processing system 1200. Such signals correspondingly control a pointer 1210 within a graphical user interface displayed on a screen display device 1201.

In the context of a computer program that is being executed by automatic data processing system 1200, a screen object generated by an operating system or one that is generated by application program such as by a world wide web browser, etc. may be displayed on screen display device 1201 as screen object 1208. As pointing device 1202 is caused to move, pointer 1210 will correspondingly move. Such positioning of pointer 1210 will be readily understood by those skilled in the art.

When an operator desires to select screen object 1208, he will position pointer 1210 thereon through movement of pointing device 1202. He may then cause screen object 1208 to be selected by causing selection button 1204 to generate a corresponding "mouse click" signal which will be communicated via cord 1206 to automatic data processing system 1200. If pointing device 1202 is one like that shown in FIGS. 1, 3, 5, 6, or 7, a rocker-type motion of an operator's hand (e.g., the operator's right hand), and, in particular, a palm portion thereof, will cause (top operable) selection button 1204 to cause a corresponding electrical selection signal (e.g., a "mouse-click" signal) further correspond to the closing of a switch operated by selection button 1204 to be produced and communicated to and processed by automatic data processing system 1200. Such "mouse-click" signals will be readily understood and appreciated by those skilled in the art.

Alternatively, If pointing device 1202 is like the one depicted in FIG. 9, a rocking motion of an operator's hand will cause a bottom-operable selection button and switch assembly to generate a corresponding selection signal which will be communicated via cord 1206 to automatic data processing system 1200 for appropriate processing.

It should be understood that although FIG. 12 illustrates the case where a screen object is selected, the same is not required. For example, operation of a selection button may occur during the course of general computer operation and control such as when an "alternative" or "right" button click is caused by a computer operator. In the context of WINDOWS™ 95, for example, a computer operator may cause an alternative or right mouse button click to arrange desktop icons, etc. WINDOWS is a registered trademark of MicroSoft Corporation. Accordingly, it should be appreciated that a pointing device according to the present invention may be used to control general computer operation in addition to selecting screen objects and the like.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A mouse for use with an automatic data processing system having a display device for displaying objects, said mouse configured to be operated by movement of an operator's hand, comprising:

a positioning system for controlling a position of a pointer within said display device of said automatic data processing system;

a mouse body having a front and a rear; and a selection button for selecting an object displayed within said display device and pointed to by said pointer, said selection button causing a selection signal to be produced and to be processed by said automatic data processing system, said selection button being disposed at said rear of said mouse body extending forward and being raised above said mouse body such as to match the contour of a palm section of said operator's hand and be operable in accordance with movement of said palm section of said operator's hand and when said palm section of said operator's hand contacts said selection button.

2. A mouse for use with an automatic data processing system having a display device for displaying objects, said mouse configured to be operated by movement of an operator's hand, comprising:

a positioning system for controlling a position of a pointer within said display device of said automatic data processing system;

a mouse body having a front and a rear; and a first selection button and a second selection button for selecting an object displayed within said display device and pointed to by said pointer, said first and second selection buttons causing corresponding selection signals to be produced and to be processed by said automatic data processing system, said first selection button being contoured to match a first portion of said operator's palm, said second selection button being contoured to match a second portion of said operator's palm, said first and second selection buttons being operable in accordance with movement of said first and second portions of said operator's palm, respectively, and when said first and second portions of said operator's palm contact said first and second selection buttons respectively.

3. The mouse in claim 2, wherein said first portion of said operator's palm is a left portion of said operator's right palm and said second portion of said operator's palm is a right portion of said operator's right palm.

4. The mouse in claim 2, wherein said first portion of said operator's palm is a left portion of said operator's left hand and said second portion of said operator's palm is a right portion of said operator's left hand.

5. The mouse in claim 2, wherein said first and second selection buttons are disposed at the rear of said mouse body.

6. A pointing device for controlling an automatic data processing system having a display device for displaying objects, said pointing device to be operated by movement of an operator's hand, comprising:

a positioning system for controlling a position of a pointer within said display device of said automatic data processing system;

a body having a front and a rear; and a first selection button and a second selection button for selecting an object displayed within said display device and pointed to by said pointer, said first and second selection buttons causing corresponding selection signals to be produced and to be processed by said automatic data processing system, said first selection button being contoured to match a first portion of said operator's palm, said second selection button being contoured to match a second portion of said operator's palm, said first and second selection buttons being operable in accordance with movement of said first and second portions of said operator's palm, respectively, and when said first and second portions of said operator's palm contact said first and second selection buttons respectively.

7. The pointing device in claim 6, wherein said first portion of said operator's palm is a left portion of said operator's right palm and said second portion of said operator's palm is a right portion of said operator's right palm.

8. The pointing device in claim 6, wherein said first portion of said operator's palm is a left portion of said operator's left hand and said second portion of said operator's palm is a right portion of said operator's left hand.

9. The pointing device in claim 6, wherein said first and second selection buttons are disposed at the rear of said body.

10. A trackball pointing device for use with an automatic data processing system having a display device for displaying objects, said trackball pointing device configured to be operated by movement of an operator's hand, comprising:

a trackball pointer positioning system for controlling a position of a pointer within said display device of said automatic data processing system;

a body having a front and a rear; and a first selection button and a second selection button for selecting an object displayed within said display device and pointed to by said pointer, said first and second selection buttons causing corresponding selection signals to be produced and to be processed by said automatic data processing system, said first selection button being contoured to match a first portion of said operator's palm, said second selection button being contoured to match a second portion of said operator's palm, said first and second selection buttons being operable in accordance with movement of said first and second portions of said operator's palm, respectively, and when said first and second portions of said operator's palm contact said first and second selection buttons respectively.

11. The pointing device in claim 10, wherein said first portion of said operator's palm is a left portion of said operator's right palm and said second portion of said operator's palm is a right portion of said operator's right palm.

12. The pointing device in claim 10, wherein said first portion of said operator's palm is a left portion of said operator's left hand and said second portion of said operator's palm is a right portion of said operator's left hand.

13. The pointing device in claim 10, wherein said first and second selection buttons are disposed at the rear of said body.

* * * * *